United States Patent
Anandavally et al.

(10) Patent No.: US 8,984,335 B2
(45) Date of Patent: *Mar. 17, 2015

(54) CORE DIAGNOSTICS AND REPAIR

(71) Applicant: International Business Machines Corporation, Armonk, NY (US)

(72) Inventors: Sreekala Anandavally, Karnataka (IN); Anand Haridass, Karnataka (IN); Gerard M. Salem, Essex Junctiom, VT (US); Diyanesh B. C. Vidyapoornachary, Karnataka (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/836,391

(22) Filed: Mar. 15, 2013

(65) Prior Publication Data

US 2014/0108859 A1    Apr. 17, 2014

Related U.S. Application Data

(63) Continuation of application No. 13/552,237, filed on Jul. 18, 2012.

(51) Int. Cl.
*G06F 11/00* (2006.01)
*G06F 11/16* (2006.01)
*G06F 11/07* (2006.01)

(52) U.S. Cl.
CPC ............ *G06F 11/0793* (2013.01); *G06F 11/16* (2013.01)
USPC ............ 714/11; 714/4.11; 714/4.12; 714/13; 714/25

(58) Field of Classification Search
USPC ............... 714/4.11, 4.12, 4.21, 11, 13, 25, 48
See application file for complete search history.

(56) References Cited

U.S. PATENT DOCUMENTS

| 5,163,052 | A | * | 11/1992 | Evans et al. ..................... 714/31 |
| 6,119,246 | A | | 9/2000 | McLaughlin et al. |
| 6,516,429 | B1 | | 2/2003 | Bossen et al. |
| 6,839,866 | B2 | * | 1/2005 | Lerman .......................... 714/13 |
| 7,231,548 | B2 | | 6/2007 | Ali |
| 7,293,153 | B2 | * | 11/2007 | Vu et al. ........................ 711/202 |
| 7,412,353 | B2 | | 8/2008 | Borkar et al. |
| 7,467,325 | B2 | * | 12/2008 | Eisen et al. ...................... 714/10 |

(Continued)

FOREIGN PATENT DOCUMENTS

| EP | 1391822 A3 | 2/2004 |
| GB | 2407414 A | 4/2005 |

OTHER PUBLICATIONS

Mushtaq, H., et al.; "Survey of Fault Tolerance Techniques for Shared Memory Multicore/Multiprocessor Systems"; IEEE; p. 12-17; 2011.

(Continued)

*Primary Examiner* — Scott Baderman
*Assistant Examiner* — Paul Contino
(74) *Attorney, Agent, or Firm* — Cantor Colburn LLP; Margaret McNamara

(57) ABSTRACT

Embodiments of the disclosure are directed to an apparatus that comprises a first core susceptible to an error condition, and a second core configured to perform a diagnostic on the first core to identify a cause of the error condition and an action to remedy the error condition in order to recover the first core.

9 Claims, 5 Drawing Sheets

(56) References Cited

U.S. PATENT DOCUMENTS

| | | | |
|---|---|---|---|
| 7,509,533 B1 | 3/2009 | Govindarajalu | |
| 7,523,346 B2 | 4/2009 | Barlow et al. | |
| 7,694,175 B2 * | 4/2010 | Barlow et al. | 714/10 |
| 7,707,452 B2 | 4/2010 | Cordero et al. | |
| 7,770,067 B2 * | 8/2010 | Lockwood et al. | 714/30 |
| 7,853,825 B2 | 12/2010 | Varadarajan et al. | |
| 8,601,300 B2 * | 12/2013 | Anderson et al. | 713/320 |
| 2004/0095833 A1 | 5/2004 | Marisetty et al. | |
| 2004/0221193 A1 | 11/2004 | Armstrong et al. | |
| 2006/0230308 A1 * | 10/2006 | Barlow et al. | 714/11 |
| 2006/0248384 A1 | 11/2006 | Safford | |
| 2007/0074011 A1 | 3/2007 | Borkar et al. | |
| 2008/0005616 A1 | 1/2008 | Barlow et al. | |
| 2008/0163255 A1 | 7/2008 | Munoz et al. | |
| 2008/0235454 A1 | 9/2008 | Duron et al. | |
| 2009/0094484 A1 | 4/2009 | Son et al. | |
| 2009/0292897 A1 * | 11/2009 | Koinuma | 711/173 |
| 2010/0146342 A1 | 6/2010 | Davenport et al. | |
| 2010/0192012 A1 | 7/2010 | Parulkar | |
| 2010/0268986 A1 | 10/2010 | Verdoorn, Jr. et al. | |
| 2011/0161729 A1 | 6/2011 | Ritz et al. | |
| 2012/0317442 A1 | 12/2012 | Nagano et al. | |

OTHER PUBLICATIONS

Microsoft Corporation, "Microsoft Computer Dictionary 5th Edtion" 2002, Microsoft Press, p. 141.

Non Final Office Action for U.S. Appl. No. 13/552,237, mailed Dec. 27, 2013, 25 pages.

* cited by examiner

| Symptoms (502) | Cause (504) | Corrective Action (506) |
|---|---|---|
| Circuit issue leading to functional failure | Voltage guard banding | Bump voltage |
| Circuit issue leading to functional failure | Frequency guard banding | Decrease frequency |
| Functional failure on max performance mode | Not operable in Turbo mode | Update energy policy to support only nominal or power save mode |
| Weaker latch(es) leading to functional failure | Excessive voltage or thermal stress (or) process issue (or) Performance degradation over a period of years | Time lead or log of the signal with help of chicken switches using pok bits |

FIG. 5

CORE DIAGNOSTICS AND REPAIR

CROSS-REFERENCE TO RELATED APPLICATIONS

This application is a continuation of U.S. Non-Provisional application Ser. No. 13/552,237, entitled "CORE DIAGNOSTICS AND REPAIR", filed Jul. 18, 2012, which is incorporated herein by reference in its entirety.

BACKGROUND

The present disclosure relates generally to core diagnostics and repair, and more specifically, to error identification and recovery.

As the number of cores (e.g., processor cores) implemented in a platform or system increases, it may be desirable to provide or facilitate core recovery. For example, as the number of cores increases, all other things being equal it becomes statistically more likely that at least one core will incur an error. Core recovery may enhance reliability by ensuring the availability of operative cores.

In order to provide for core recovery, it is necessary to determine whether a core subject to an error can be repaired. Current techniques are unable to determine the cause of the error.

SUMMARY

According to one or more embodiments of the present disclosure, an apparatus comprises a first core susceptible to an error condition, and a second core configured to perform a diagnostic on the first core to identify a cause of the error condition and an action to remedy the error condition in order to recover the first core.

According to one or more embodiments of the present disclosure, a method comprises performing, by a second core, a diagnostic on a first core associated with an error condition, identifying a cause of the error condition, identifying an action to remedy the error condition based on the identified cause of the error condition, applying the identified action, and recovering the first core based on having applied the action.

According to one or more embodiments of the present disclosure, a system comprises a plurality of cores comprising a first core and a first spare, and firmware configured to select a diagnostic to be applied to the first core responsive to a detection of an error associated with the first core and to provide the diagnostic to the first spare, the first spare configured to perform the diagnostic on the first core and to pass a result of the diagnostic to the firmware.

According to one or more embodiments of the present disclosure, a non-transitory computer program product comprising a computer readable storage medium having computer readable program code stored thereon that, when executed by a computer, performs a method comprising performing, by a second core, a diagnostic on a first core associated with an error condition, identifying a cause of the error condition, identifying an action to remedy the error condition based on the identified cause of the error condition, applying the identified action, and recovering the first core based on having applied the action.

Additional features and advantages are realized through the techniques of the present disclosure. Other embodiments and aspects of the disclosure are described in detail herein.

For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the disclosure are apparent from the following detailed description taken in conjunction with the accompanying drawings in which:

FIG. 5 is a table illustrating exemplary symptoms, causes, and corrective actions in accordance with one or more aspects of this disclosure.

DETAILED DESCRIPTION

Figure 1:
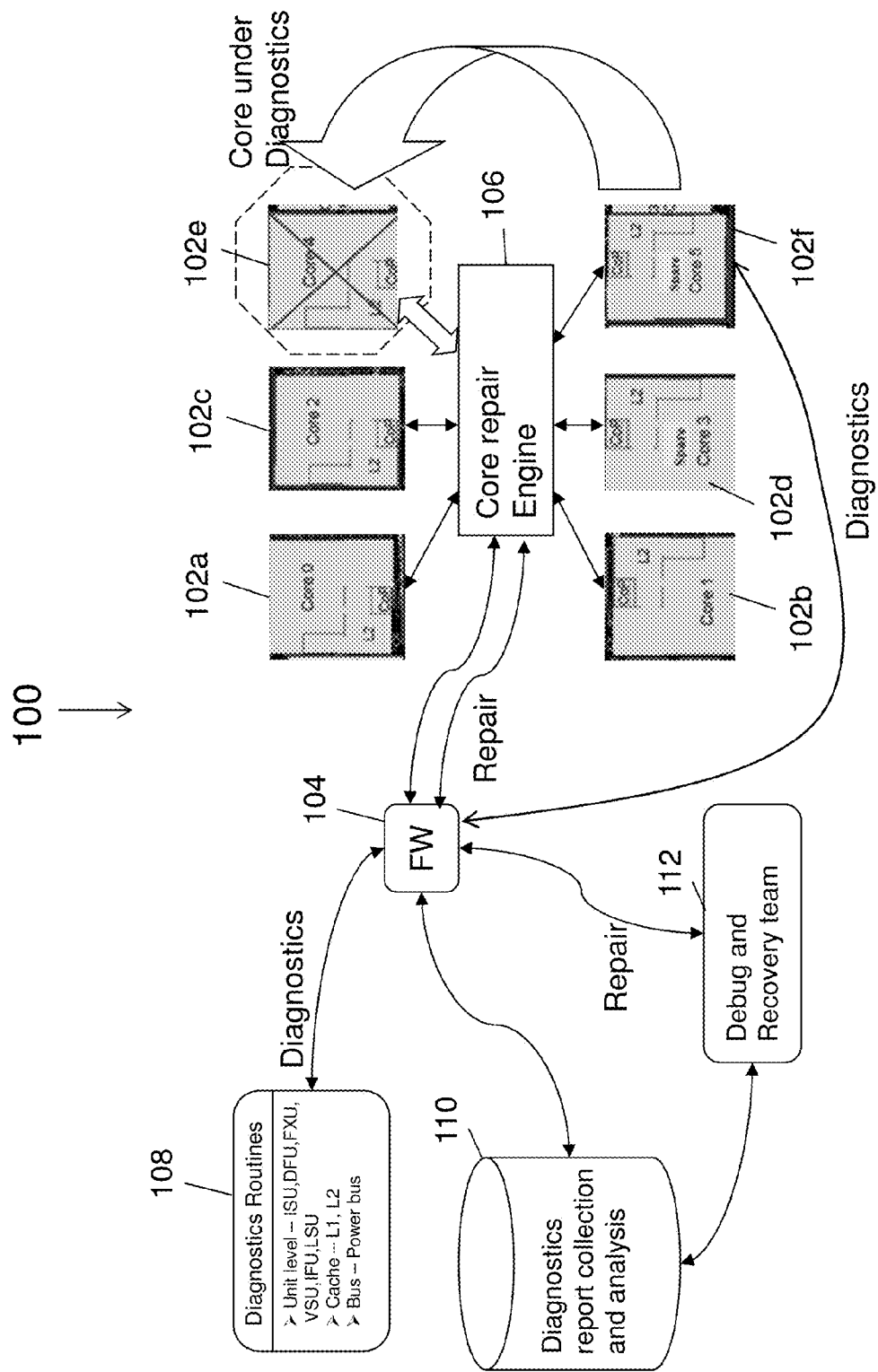
FIG. 1 is a schematic block diagram illustrating an exemplary system architecture in accordance with one or more aspects of this disclosure.

In accordance with various aspects of the disclosure, a core subject to an error (e.g., a failure) may have diagnostics applied to it. The diagnostics may identify the cause of the error and recommend a condition to run the core in. In some embodiments, the recommended condition may be different from a prior run state or condition.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect.

Referring to FIG. 1, an exemplary system architecture 100 is shown. The architecture 100 is shown as including one or more cores, such as cores 102a-102f. The cores 102a-102f may be organized at any level of abstraction. For example, the cores 102a-102f may be associated with one or more units, chips, platforms, systems, nodes, etc. In some of the illustrative examples discussed below, the cores 102a-102f are described as being associated with a processor (e.g., a microprocessor).

One or more of the cores 102a-102f may include, or be associated with, one or more memories. The memories may store data and/or instructions. The instructions, when executed, may cause the cores to perform one or more methodological acts, such as the methodological acts described herein.

In a multi-core processor, one or more of the cores may be treated as a spare. For example, in connection with the architecture 100, the cores 102a, 102b, 102c, and 102e may generally be operative and the cores 102d and 102f may be treated as spares under normal or regular operating conditions. In some embodiments, the cores 102d and 102f when operating as backup or spare cores may be at least partially powered down or turned off to conserve power and/or to extend their operational life.

In some embodiments, a core may be susceptible to one or more errors. For example, a core may initially be acceptable (e.g., may be fabricated, assembled, or constructed so as to function properly), but may develop an error at a later point in time.

In some instances, a core may be subject to an error. For example, in connection with the architecture 100, the core 102e is illustrated with an 'X' through it, thereby indicating that an error may have been detected in connection with the core 102e. The error may have been detected by one or more entities, such as firmware (FW) 104 and/or a core repair engine 106.

The error detected in connection with the core 102e may be recoverable in the sense that a recovery process may allow the core 102e to be restored to an operative state or condition, such as a fully or partially operative state or condition. A recovery process may reset or restore the core 102e to a last known good architectural state, optionally based on one or more checkpoints. A recoverable error may be "healed" after recovery if the error is of a transient nature.

The error detected in connection with the core 102e may be non-recoverable. A non-recoverable error may mean that the core 102e is identified as having one or more hardware defects. A non-recoverable error may be "spareable" or "non-spareable." In the case of a spareable error, the core 102e may be isolated and a spare core (e.g., the core 102d) may be used in place of the core 102e. In the case of a non-spareable error, another core might not be able to be used in place of the core 102e. For example, the non-spareable error may be such that the error impacts the operation of the other cores (e.g., the core 102d).

Once an error is detected with the core 102e, the core 102e may be isolated and a spare core (e.g., the core 102d) may assume the functionality of the core 102e. The FW 104 may call or invoke one or more diagnostic routines 108 in an effort to diagnose and/or recover the core 102e. A diagnostic routine 108 may run at any level of abstraction, such as at a unit level, a memory or cache level, a bus level, etc. The selection of a diagnostic may be a function of the operations performed by the core 102e, code executing on the core 102e, an identification of one or more inputs to the core 102e when the error was detected, the state of the core 102e when the error was detected, the state of the other cores 102a, 102b, and/or 102c, or any other condition.

Once a diagnostic is selected by the FW 104, the FW 104 may convey or pass the diagnostic to a spare core, such as the core 102f. In this manner, the core 102f may be treated as, or turned into, a service assisted process (SAP) core. An SAP core may perform diagnosis and/or recovery of a core as described further below. In some embodiments, an SAP core (e.g., the core 102f) may be the only core to interact or communicate with a core (e.g., the core 102e) that is in an error state or condition. In some embodiments, an SAP core may select a diagnostic to run or execute.

The selected diagnostic may be run or executed against the core 102e. The core 102f, operating as an SAP core, may collect or aggregate the results of having run the diagnostic against the core 102e. The core 102f may communicate or pass the results to the core repair engine 106, which may include or be associated with a pervasive infrastructure that has communication ports to all of the cores 102a-102f, or a subset thereof. The core 102f and/or the core repair engine 106 may create a report based on the results of the diagnostic.

The results and/or the report may be provided to the FW 104. The results and/or the report may be stored in a database 110. The results and/or report may be provided to a debug and recovery team 112, optionally by way of one or more alerts, alarms, messages, etc. The debug and recovery team 112, which may include service personnel, may examine the results and/or report to determine one or more actions to take. For example, the actions may comprise one or more of the following: a circuit level fix that goes in as part of the FW 104, core related parameters (voltage/frequency) update etc. (or) alternatively, the FW 104 can direct the core repair engine 106 with suitable control action(s) to be performed that may facilitate repairing or recovering the core 102e. The commands or directives may be communicated from the FW 104 to the core 102e via the core repair engine 106.

The architecture 100 may be used to ensure so-called reliability, availability, and serviceability (RAS) performance. For example, it may be desirable to ensure operability of, e.g., a processor in accordance with one or more parameters, such as a time standard, a power budget, etc. Diagnosis and recovery of a core (e.g., the core 102e) may facilitate meeting or adhering to RAS standards or metrics.

Figure 2:
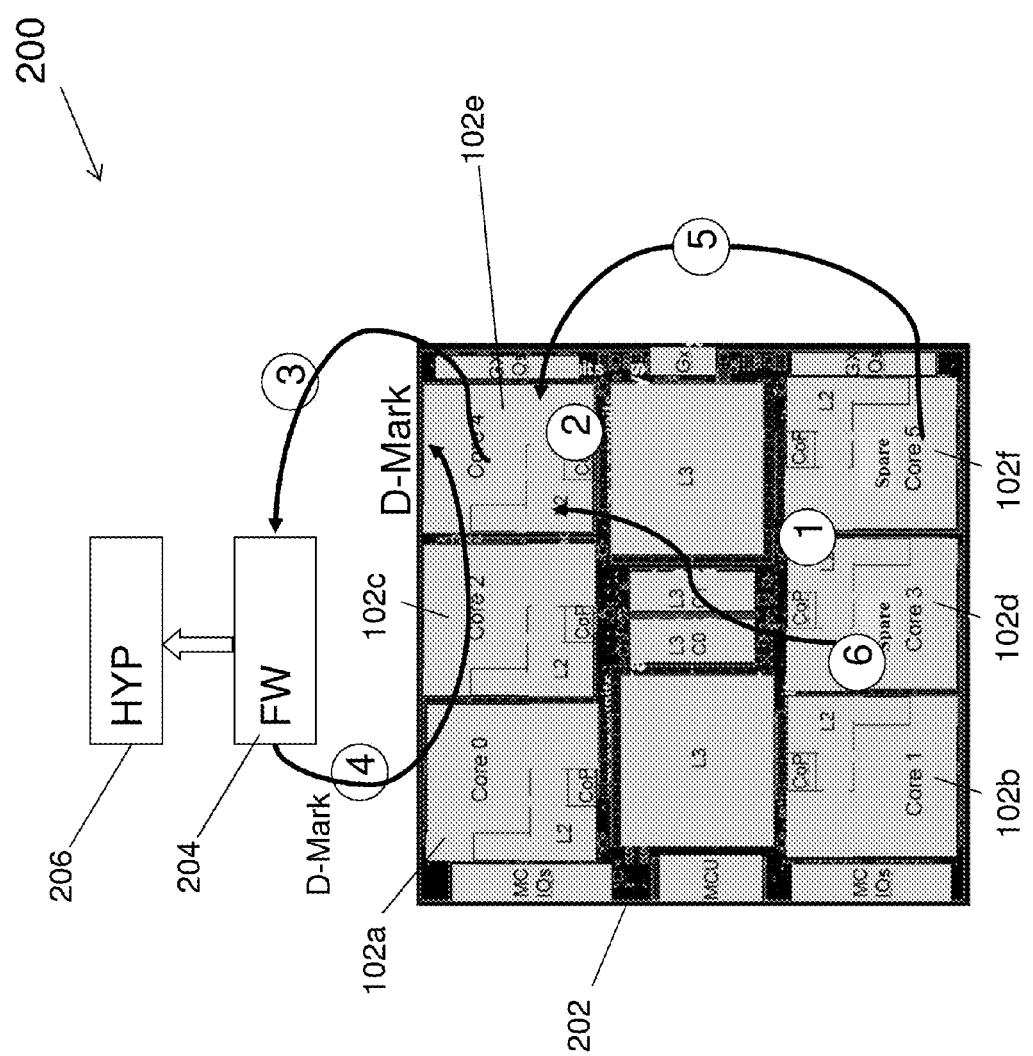
FIG. 2 is a schematic block diagram illustrating an exemplary environment in accordance with one or more aspects of this disclosure.

FIG. 2 illustrates a schematic block diagram of an exemplary environment 200 in accordance with one or more aspects of this disclosure. The environment 200 is shown in FIG. 2 as including a processor 202. The processor 202 may include, or be associated with, one or more components or devices, such as the cores 102a-102f.

The processor 202 may be coupled to one or more entities, such as firmware (FW) 204. In some embodiments, the FW 204 may correspond to the FW 104 of FIG. 1. The FW 204 may be coupled to a hypervisor (HYP) 206, such as a power hypervisor. The HYP 206 may perform any number of functions, such as controlling time slicing of operations or routines associated with the cores 102a-102f, managing interrupts (e.g., hardware interrupts), re-allocating resources across one or more systems or platforms, and dispatching workloads.

The environment 200 is shown in FIG. 2 with a number of operations 1-6 schematically overlaid on top of it. The operations 1-6 are described below.

In operation 1, one or more cores may be designated as being available for RAS purposes. For example, the cores 102d and 102f may be designated as spare cores.

In operation 2, an error may be detected with a core, such as the core 102e. Recovery of the core 102e may be possible if, for example, the detected error is transient in nature.

If recovery is not possible (potentially after one or more iterations of a recovery process), a so-called "hot fail" may be declared in operation 3. The FW 204 may message the HYP 206 to diagnostics-mark (D-mark) or flag the core 102e, optionally in connection with a processor or system configuration.

In operation 4, the FW 204 or the HYP 206 may D-mark the core 102e. By D-marking the core 102e, the core 102e might not be accessible to other cores (e.g., the cores 102a-102c) for normal operation. The core 102e may only be accessible for diagnosis once it is D-marked.

In operation 5, a spare core (e.g., the core 102f) may be activated or allocated to assume the functionality of the D-marked core (e.g., the core 102e). In this manner, the error associated with the core 102e may be transparent to external devices or entities coupled to, or associated with, the processor 202. In other words, any potential performance degradation resulting from the error may be less than some threshold or minimized.

In operation 6, a second spare core (e.g., the core 102d) may be used as an SAP core to perform a diagnosis on the D-marked core (e.g., the core 102e). Once the diagnosis is complete, if recovery was possible the D-marking may be removed from the core 102e, the core 102e may be put back into service, and the cores 102*d* and 102*f* may be returned to inactive or spare status. In some embodiments, upon recovery, the core 102*e* may be treated as a spare and the core 102*f* may continue to be utilized as an active core. If recovery of the core 102*e* was not possible, a report may be prepared and recorded regarding, e.g., the inability to recover the core 102*e*, diagnostic(s) run against the core 102*e*, the results of the diagnostic(s), etc.

Figure 3:
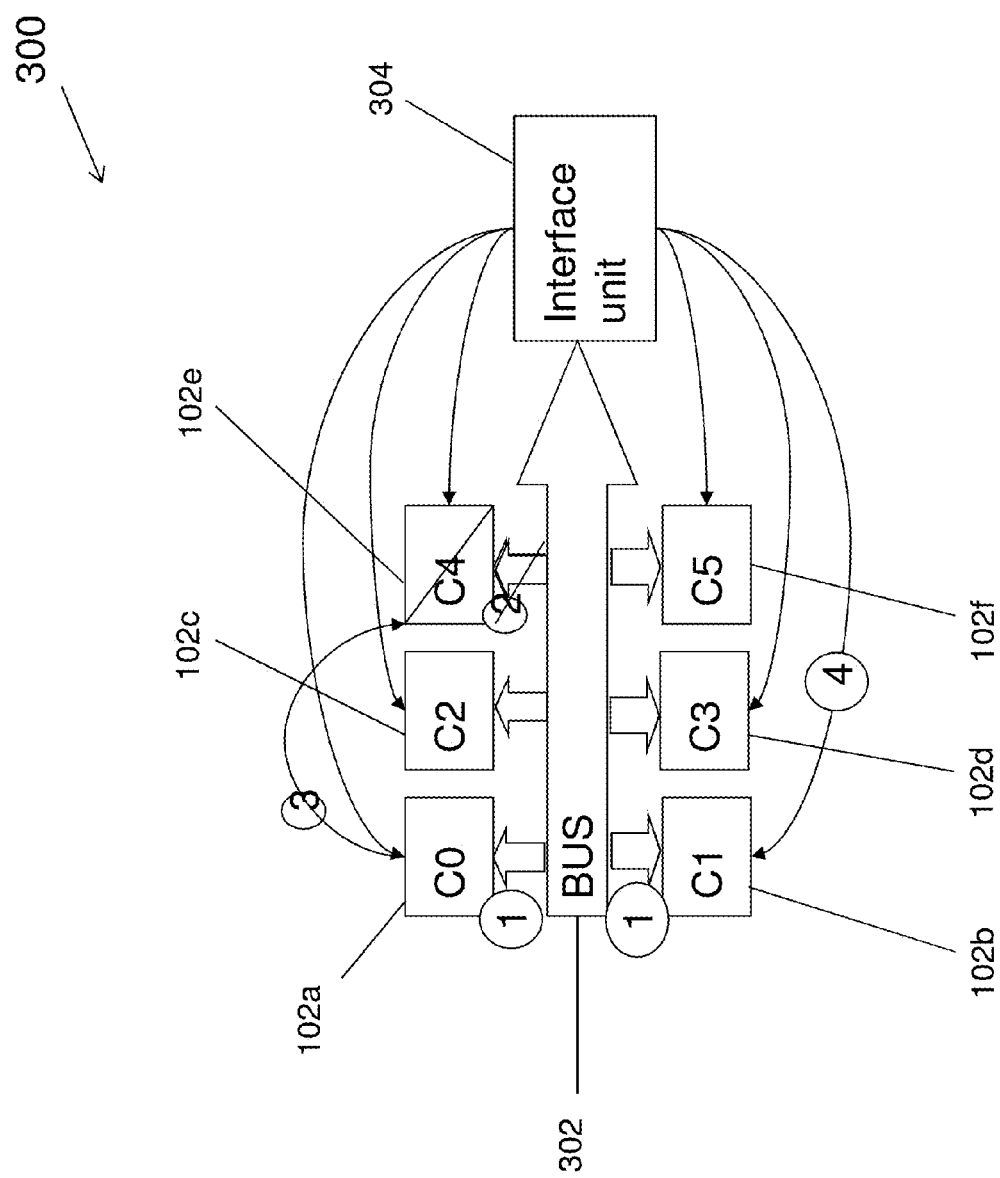
FIG. 3 is a schematic block diagram illustrating an exemplary environment in accordance with one or more aspects of this disclosure.

FIG. 3 illustrates a schematic block diagram of an exemplary environment 300 in accordance with one or more aspects of this disclosure. The environment 300 is shown in FIG. 3 as including, or being associated with, the cores 102*a*-102*f*, an interconnect bus 302 (e.g., a power bus), and an interface unit 304 (e.g., an alter display unit). In some embodiments, the interface unit 304 may be associated with one or more components or devices of a pervasive architecture, such as the core repair engine 106 of FIG. 1.

The environment 300 is shown in FIG. 3 with a number of operations 1-4 schematically overlaid on top of it. The operations 1-4 are described below.

In operation 1, one or more spare cores may be identified for RAS purposes. For example, the cores 102*a* and 102*b* may be identified as spares.

In operation 2, a core (e.g., the core 102*e*) may experience an error. The core 102*e* may be fenced off from the rest of the cores and removed from the configuration.

In operation 3, a spare core (e.g., the core 102*a*) may be used to at least temporarily replace the fenced core (e.g., the core 102*e*).

In operation 4, a second spare core (e.g., the core 102*b*) may engage in a diagnosis of the fenced core (e.g., the core 102*e*). As part of the diagnosis, the second spare core may scrub the fenced core via the interface unit 304.

In the environment 300, all communications between the cores 102*a*-102*f* may be routed through the interface unit 304. In this manner, a SAP core (the core 102*b* in the example described above in connection with FIG. 3) may communicate to a core with an error (the core 102*e* in the example described above in connection with FIG. 3) through the interface unit 304. The interface unit 304 may include a first interface, such as a pervasive bus communication interface (e.g., a system center operations manager (SCOM) interface), to couple to the cores 102*a*-102*f*. The interface unit 304 may couple to the bus 302 via a second interface.

Figure 4:
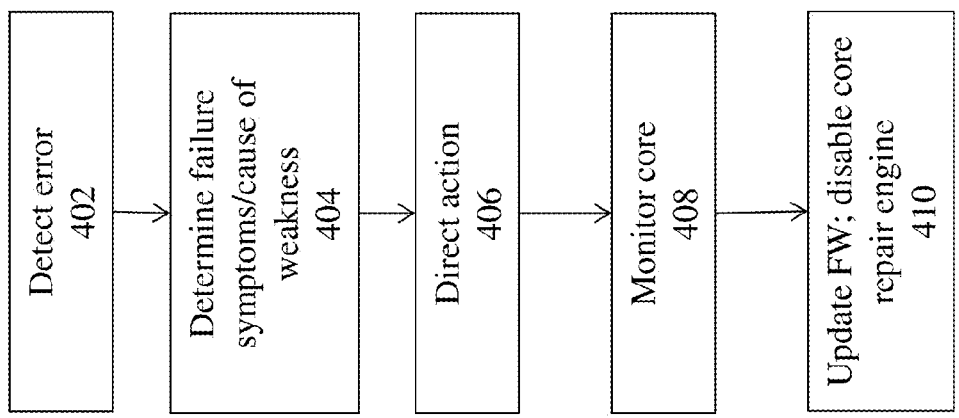
FIG. 4 is a flow diagram illustrating an exemplary method in accordance with one or more aspects of this disclosure.

FIG. 4 illustrates a method that may be used to repair a core that has an error associated with it, in accordance with an exemplary embodiment.

In block 402, an error associated with a core may be detected. As part of block 402, the core with the error may be isolated via, e.g., a D-marking or a fence.

In block 404, failure symptoms and/or a cause of weakness may be determined responsive to having detected the error of block 402. For example, FIG. 5 illustrates, in tabular form, exemplary symptoms 502 that may be experienced by a core that has an error, potential causes 504 for those symptoms 502, and one or more corrective actions 506 that may be engaged to remedy the error or cause 504. For example, referring to FIG. 5, if a circuit or core experiences an issue leading to a functional failure, such a failure may be caused by (an improper) voltage guard banding; to remedy such a condition, a bump or adjustment in an applied voltage may be needed. The symptoms 502, causes 504, and/or actions 506 may be determined by one or more entities, such as the code repair engine 106 of FIG. 1, based on an execution of one or more diagnostics.

In block 406, FW (e.g., the FW 104 or the FW 204) may direct the core repair engine 106 to deliver a suitable control action based on the determination of block 404. For example, the FW may direct the core repair engine 106 to command the core experiencing an error to take one or more of the actions 506 based on detected symptoms 502 and/or determined causes 504.

In block 408, the core that experienced an error may be monitored to determine if the action of block 406 remedied the error condition. If the monitoring of block 408 indicates that the error has been remedied or eliminated, the core that experienced the error may be recovered for normal use or may be treated as a spare. In this regard, a D-marking or fencing associated with the recovered core may be removed. If the monitoring of block 408 indicates that the error has not been remedied or eliminated, additional diagnostics may be executed and/or a message, warning, or alert may be generated.

In block 410, the FW may be updated to reflect the status of the monitoring of block 408. For example, if the core that experienced the error condition was recovered, such a status may be denoted by the FW. As part of block 410, the core repair engine 106 may be turned off or disabled.

It will be appreciated that the events or blocks of FIG. 4 are illustrative in nature. In some embodiments, one or more of the events (or a portion thereof) may be optional. In some embodiments, one or more additional events not shown may be included. In some embodiments, the events may execute in an order or sequence different from what is shown in FIG. 4.

Aspects of the disclosure may be implemented independent of a specific instruction set (e.g., CPU instruction set architecture), operating system, or programming language. Aspects of the disclosure may be implemented at any level of computing abstraction.

In some embodiments, a spare core may be used to perform diagnostics on a defective core. A repair engine (e.g., a hardware repair engine), which may optionally be part of a pervasive infrastructure, may attempt to recover the defective core by taking one or more actions, such as controlling analog knobs, invoking recovery circuits, optimizing policies (e.g., energy, thermal, frequency, voltage, current, power, throughput, signal timing policies), etc.

In some embodiments, a repair engine may interlock with firmware, a hypervisor, an alter display unit, or another entity of a pervasive infrastructure to perform bus or system center operations manager driven diagnostics. The diagnostics may be performed during run time, optionally by D-marking or fencing a core that experiences an error.

In some embodiments, a root cause of an error may be identified. The error may be remedied at run time or offline with the assistance of a recovery team, optionally based on data obtained via diagnostics. In some embodiments, a reboot of a core or processor may occur, such as after a repair has been performed. In some embodiments, a reboot might not be performed following diagnosis, repair, reallocation or de-allocation of a core or processor.

In some embodiments various functions or acts may take place at a given location and/or in connection with the operation of one or more apparatuses or systems. In some embodiments, a portion of a given function or act may be performed at a first device or location, and the remainder of the function or act may be performed at one or more additional devices or locations.

In some embodiments a repair engine (e.g., a core repair engine) may be part of a pervasive infrastructure of a chip. System operation (e.g., mainline system operations) may be interleaved with core diagnostics and/or repair action. Such interleaving may provide for concurrency, such as concurrency in diagnostics.

As will be appreciated by one skilled in the art, aspects of this disclosure may be embodied as a system, method or computer program product. Accordingly, aspects of the present disclosure make take the form of an entirely hardware embodiment, an entirely software embodiment (including firmware, resident software, micro-code, etc.) or embodiments combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific example (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming language, including an object oriented programming language such as Java, Smalltalk, C++ or the like and conventional procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, an apparatus or system may comprise at least one processor, and memory storing instructions that, when executed by the at least one processor, cause the apparatus or system to perform one or more methodological acts as described herein. In some embodiments, the memory may store data, such as one or more data structures, metadata, etc.

Embodiments of the disclosure may be tied to particular machines. For example, in some embodiments diagnostics may be run by a first device (e.g., a spare core) against a second device (e.g., a core) that experiences an error. The diagnostics may be executed during run time of a platform or a system, such that the system might not be brought down or turned off. In some embodiments, the second device that experiences the error may be recovered based on an identification of a cause of the error and a corrective action applied to the second device to remedy the error.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There may be many variations to the diagram or the steps (or operations) described therein without departing from the spirit of the disclosure. For instance, the steps may be performed in a differing order or steps may be added, deleted or modified. All of these variations are considered a part of the disclosure.

It will be understood that those skilled in the art, both now and in the future, may make various improvements and enhancements which fall within the scope of the claims which follow.

What is claimed is:

1. A method comprising:
   detecting an error condition associated with a first core of a plurality of cores;
   fencing the first core to isolate the first core from other cores of the plurality of cores in response to the detecting of the error condition associated with the first core;
   performing, by a second core of the plurality of cores, a diagnostic on the first core associated with the error condition by directly communicating with the first core to identify a cause of the error condition;
   operating a third core of the plurality of cores as the first core when the first core is associated with the error condition;
   facilitating a repair associated with the error condition, by a core repair, by a core repair engine that is separate from the first, second, and third cores, by directly communicating directives to the second core;
identifying an action to remedy the error condition based on the identified cause of the error condition;
applying the identified action; and
recovering the first core based on having applied the action.

2. The method of claim 1, wherein the first core is recovered during a run time operation.

3. The method of claim 1, further comprising:
prior to recovering the first core, diagnostics-marking the first core to preclude the third core from accessing the first core.

4. The method of claim 1, further comprising:
applying a repair to the first core in order to recover the first core.

5. The method of claim 4, wherein the repair comprises optimizing a policy selected from at least one of an energy policy, a thermal policy, a frequency policy, a voltage policy, a current policy, a power policy, and a signal timing policy.

6. The method of claim 1, further comprising:
operating the third core as the first core and the first core as a spare subsequent to the recovering of the first core based on having applied the action.

7. The method of claim 1, wherein the cause of the error condition is a transient error that enables the recovery of the first core.

8. The method of claim 1, wherein the plurality of cores is part of a multi-core processor.

9. The apparatus of claim 1, further comprising:
operating the third core as a spare and resuming the operations of the first core subsequent to the recovery of the first core via the action.

* * * * *